United States Patent Office 2,895,292
Patented July 21, 1959

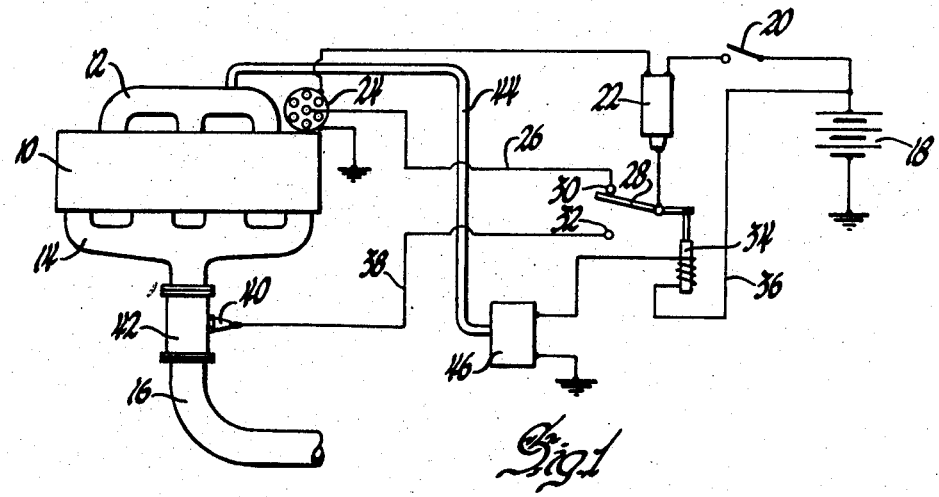
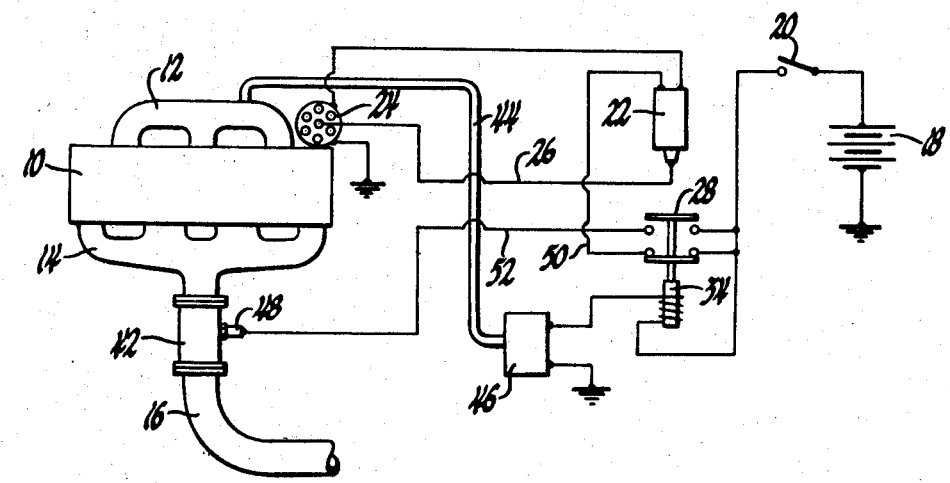

2,895,292

FUEL AND EXHAUST GAS COMBUSTION CONTROL OF AN INTERNAL COMBUSTION ENGINE

Joseph T. Wentworth, Royal Oak, Mich., assignor to General Motors Corporation, Detroit, Mich., a corporation of Delaware Application October 10, 1956, Serial No. 615,067

5 Claims. (Cl. 60—29)

This invention relates to a fuel control method and mechanism and more particularly to a fuel control mechanism for more completely burning fuel vapors issuing from an internal combustion engine during the loaded deceleration period commonly encountered while an automotive vehicle driven by the internal combustion engine is coasting under load.

The engines of automobiles during deceleration generally emit in an unburned state up to 40% to 60% of the fuel fed to the engine. Numerous control devices to prevent this phenomenon have been proposed in the past. The most common method is to cut off the fuel supply to the engine during such deceleration periods. While this method is theoretically acceptable, it has certain shortcomings. There is a delay encountered from the time the fuel supply is cut off until the fuel-air mixture in the intake system passes through the engine. When the deceleration period is ended there is an additional delay in getting a combustible mixture into the cylinders. This delay causes intermittent operation of the automotive engine until a proper mixture is being delivered to the cylinders. Other proposals have suggested burning the fuel and air mixture at a point in the exhaust system after the partial combustion has taken place within the engine. In order to have this type system operate efficiently it has been found necessary to add air to the exhaust burner. Various transmissions have been proposed and used which eliminate the engine overrun condition by providing an overruning clutch so that the engine is not used as a brake during deceleration. The invention overcomes the shortcomings of the other systems by eliminating the delay in obtaining a combustible mixture in the cylinder and retaining the benefits of engine braking without appreciable outlay of additional equipment or loss of efficiency.

The fuel-air mixture is allowed to pass through the engine cylinders during deceleration without burning and is burned instead at a point in the exhaust system. This is accomplished by disconnecting the spark lead to the spark plugs in the cylinders and connecting it to an electrical igniting device in the exhaust pipe, or by providing a non-electrical igniting device in the pipe and permitting the fuel air mixture to remain unburned until it reaches the exhaust pipe. Experiments have shown that, with such a device installed on an internal combustion engine of the automotive type, up to 95% of the hydrocarbons are burned under decelerating conditions when the device is in use, while under normal decelerating conditions, with the engine burning a portion of the mixture within the cylinders, only 40% to 60% of the hydrocarbons are burned.

In the drawings:

Figure 1 is a schematic presentation of an internal combustion engine with electrical circuits embodying the invention and using a spark plug in the exhaust pipe.

Figure 2 is a modification of the system of Figure 1 in which a glow plug is mounted in the exhaust pipe.

Figure 3:
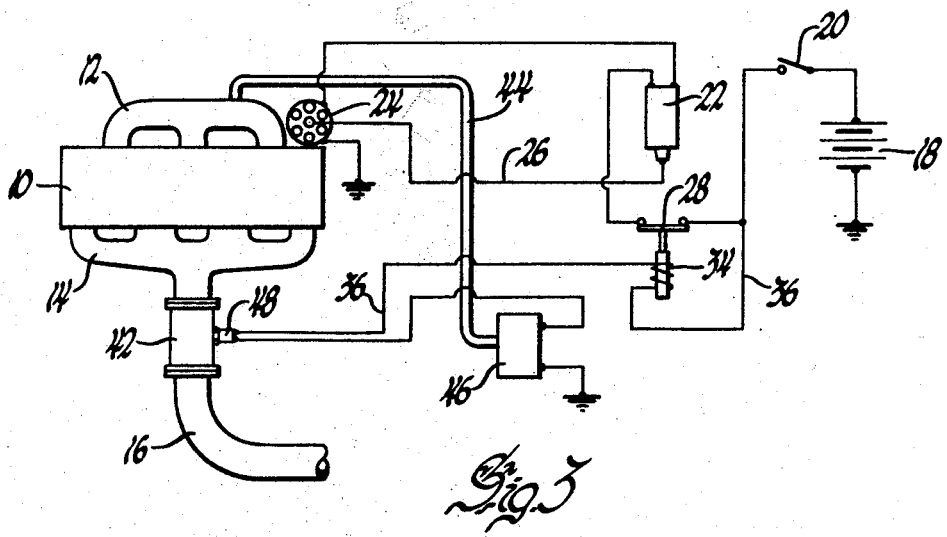
Figure 3 is a modification of the glow plug system of Figure 2.

In the Fig. 1 arrangement an internal combustion engine 10 having an intake manifold 12 and an exhaust manifold 14 connected to an exhaust pipe 16 is provided with an electrical ignition system including a battery 18, an ignition switch 20, a spark coil 22 and a distributor 24. The distributor 24 may have make-and-break points and a rotor, as is well known in the art. The make-and-break points are in the coil primary circuit and the rotor is in the coil high voltage secondary circuit. The high voltage coil secondary circuit 26 connects coil 22 with distributor 24. A relay operated switch 28 having contact points 30 and 32 may be placed in secondary circuit 26 and is preferably operated by a relay 34 in relay circuit 36. Contact point 32 has a wire lead 38 connecting it to a spark plug 40 which may be located in a portion 42 of exhaust pipe 16. A vacuum line 44 may be connected with intake manifold 12 and lead to a vacuum switch 46 which is in relay circuit 36. Switch 28 is normally biased to close with contact 30, connecting the high voltage spark lead from coil 22 to the distributor 24.

Under normal engine operating conditions the intake manifold vacuum rises to a maximum of about 21 inches of mercury. This is obtainable only at engine idle speeds. During engine deceleration under load, however, the intake manifold vacuum rises from 21 inches to 26 inches of mercury. Since this extremely high intake manifold vacuum is not obtained under any condition other than deceleration under load, it is used to control the relay circuit, which is to be energized only during deceleration under an overruning load. Vacuum switch 46 is calibrated to close at a vacuum slightly above the idle vacuum. When switch 46 closes, the coil of relay 34 is energized, moving the relay armature and opening switch 28 at contact point 30 and closing it at contact point 32. The spark lead is then withdrawn from the distributor and redirected to spark plug 40 in the exhaust pipe. Since there is no ignition spark in the engine cylinders, the fuel-air mixture inducted in the cylinders is not burned there, but passes through the engine and exhaust manifold and is ignited and burned in the exhaust pipe. Combustion of this mixture in the exhaust pipe is not hampered by being diluted with burned exhaust gas or the low pressures that are present in the engine cylinders during normal operation. By allowing the fuel-air mixture to continue to flow to the engine and to pass through the cylinders in an unburned condition, there is no delay in getting a combustible mixture into the cylinder when it is desired to accelerate. Response to any throttle opening is immediate since the intake vacuum will instantly decrease and relay 34 will be de-energized. The engine will therefore respond instantly without hesitation and perform more smoothly. If the fuel-air mixture were allowed to burn in the engine during deceleration and the unburned portions of the charges which pass through to the exhaust pipe to be burned as described above, the exhaust pipe burning operation would not be as efficient since the exhaust gases and the unburned fuel-air mixture are thoroughly mixed at this point, causing less of the unburned mixture to be burned. In order to assure complete burning of the mixture during those conditions, additional air would have to be supplied to the burner. This would require additional equipment which is not necessary when operating in accordance with the teachings of the invention.

As shown in Figure 2, a glow plug 48 may be used as the exhaust pipe igniter instead of a spark plug. In this case the relay 34 would open the spark coil primary circuit 50 and at the same time close the glow plug circuit 52, heating the glow plug filament. The need for switching the high voltage spark leads, as is necessary in the engine system shown in Figure 1, is thus obviated.

The modification shown in Figure 3 is an improvement over the system of Figure 2. Glow plug 48 is placed in series with the relay coil in the relay coil circuit 36. If the glow plug is burned out, the actuation of vacuum switch 46 has no effect on the relay coil circuit and the relay is not actuated. Engine operation is then unaffected and there is no accumulation of raw fuel in the exhaust system.

Figure 4:
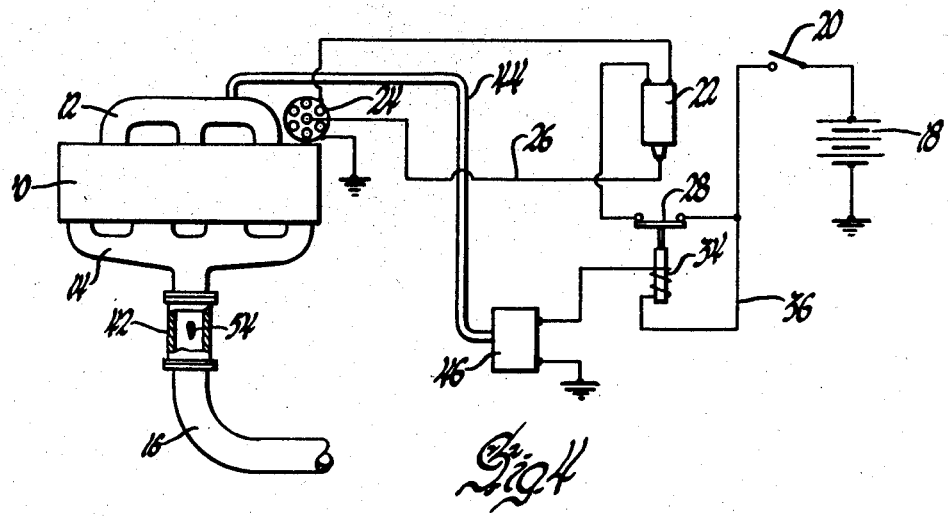
Figure 4 is a modification of the system of Figure 1 using a heat retaining element in the exhaust pipe for exhaust pipe ignition of the engine fuel-air mixture.

The spark plug or glow plug may be dispensed with as shown in Figure 4 and a heat retaining object 54, which may be a ceramic or other material, may be placed in the exhaust pipe and used to ignite the fuel-air mixture. The heat stored in object 54 during normal operation of the engine is received from the hot exhaust gases generated in the engine during normal combustion. It remains sufficiently hot to ignite the fuel-air mixture passing over it during deceleration. By using such an object it is necessary only to provide a circuit which interrupts the ignition during deceleration and no circuit is required for exhaust pipe ignition purposes. The ignition circuit interrupter may be placed in the coil primary circuit.

A method of preventing the emission of unburned hydrocarbons from the exhaust of internal combustion engines has been disclosed which obtains a high efficiency with a minimum of additional equipment while providing better engine operation under normal conditions without any decrease in fuel economy over that obtained in normal engine operation. It is an important feature of the invention that the fuel-air mixture is not cut off from the engine but is allowed to pass through the engine in an unburned state during engine overrunning conditions. While several methods of burning the fuel-air mixture at a point beyond the engine cylinders have been disclosed, it is obvious that other methods may be used to accomplish the same result. The mixture may also be burned in the exhaust manifold rather than in the engine exhaust pipe, although burning the mixture in the manifold results in slightly less efficient burning due to the intermittent nature of fuel-air mixture flow at any point immediately adjacent to the cylinders. A flame arrester may be provided to hold the flame created in the exhaust system to an area beyond the engine manifold and terminating at a point removed from the end of the exhaust pipe or a muffler which may be installed in the exhaust system.

What is claimed is:

1. In an internal combustion engine having a spark ignition system and an intake manifold for introducing the fuel-air mixture into said engine and an exhaust system for removing exhaust gases from said engine, means for deenergizing said engine ignition system whereby said fuel-air mixture is permitted to pass through said engine in an unburned state, and means in said engine exhaust system controlled by said deenergizing means for igniting said exhausted unburned fuel-air mixture.

2. Mechanism for controlling the ignition of unburned hydrocarbons from an internal combustion engine having an intake manifold, an exhaust system, combustion cylinders, spark plugs, an electric power source, a coil having primary and secondary circuits, make-and-break points in said coil primary circuit, and a distributor rotor in said secondary circuit for distributing high voltage generated in said secondary circuit to said spark plugs, said mechanism comprising an electrically operated igniting device in said engine exhaust system and means sensitive to the vacuum generated in said intake manifold for opening said coil secondary circuit to said distributor rotor and connecting said circuit with said igniting device in said exhaust system whereby the fuel-air mixture introduced into said internal combustion engine passes through said combustion cylinders without igniting, said exhaust system igniting device igniting said fuel-air mixture in said exhaust system, said vacuum sensitive means being operable when said internal combustion engine is decelerating under load at substanially zero throttle.

3. A control system for controlling the emission of unburned fuel from a spark ignited internal combustion engine, said control system including an ignition coil, a coil primary circuit, a coil secondary circuit, means sensitive to engine load driven deceleration conditions, a relay circuit controlled by said means and including a solenoid and an igniting device in the exhaust system of said engine, said solenoid when energized being operative to disconnect at least one of said coil circuits from said engine whereby all the fuel-air mixture introduced in said engine passes therethrough in an unburned state and is ignited in said exhaust system by said exhaust igniting device.

4. In an internal combustion engine fuel ignition control system for an electrically ignited internal combustion engine having fuel and air intake system and an exhaust system, an electrical power supply, an ignition coil having primary and secondary circuits, said primary circuit having a relay operated switch including normally closed contacts in said primary circuit, a relay circuit having a relay coil and a normally open relay control switch in series, and an engine exhaust ignition circuit having an electrically operated igniting device mounted in said engine exhaust system, said relay operated switch including normally open contacts, means for closing said relay control switch responsive to predetermined engine conditions whereby said relay operated switch is actuated by said relay coil and said normally closed relay operated switch contacts are opened and said normally open relay operated switch contacts are closed to deenergize said engine ignition and energize said exhaust igniting device to ignite all of the fuel-air mixture for said engine in said engine exhaust system.

5. In a fuel combustion control system for an internal combustion engine, said engine having a spark ignition system including an electrical source, an ignition coil, a distributor and spark plugs, said fuel combustion control system including a switch in said engine ignition system for deenergizing said spark plugs, a relay for controlling said switch, an electrical igniting device in series with said relay, a relay control switch in series with said igniting device and said relay, and means for closing said relay control switch whereby said relay and said electrical igniting device are energized causing said relay actuated switch in said ignition system to be opened, said electrical igniting device being mounted in the exhaust system of said engine and igniting the engine fuel-air mixture, causing said mixture to be burned in said exhaust system.

References Cited in the file of this patent

UNITED STATES PATENTS 2,488,563    Sills ------------------ Nov. 22, 1949